Sept. 21, 1965 E. R. GORCYCA 3,207,522
TWO-PIECE DUST GUARD
Filed May 17, 1962 3 Sheets-Sheet 1

INVENTOR.
EDWARD R. GORCYCA
BY
Wallace, Kinzer and Dorn
ATTORNEYS

Sept. 21, 1965 E. R. GORCYCA 3,207,522
TWO-PIECE DUST GUARD
Filed May 17, 1962 3 Sheets-Sheet 2

INVENTOR.
EDWARD R. GORCYCA
BY
ATTORNEYS

Sept. 21, 1965   E. R. GORCYCA   3,207,522
TWO-PIECE DUST GUARD
Filed May 17, 1962   3 Sheets-Sheet 3

INVENTOR.
EDWARD R. GORCYCA
BY
Wallace, Kinzer and Doru
ATTORNEYS

United States Patent Office 3,207,522
Patented Sept. 21, 1965

3,207,522
TWO-PIECE DUST GUARD
Edward R. Gorcyca, Mahwah, N.J., assignor to American Brake Shoe Company, New York, N.Y., a corporation of Delaware
Filed May 17, 1962, Ser. No. 195,491
1 Claim. (Cl. 277—130)

This invention relates to a dust guard of the kind used in a railroad journal box at the wheel side thereof to preclude the entrance of foreign matter into the journal box.

The journal portion of the axle of a railroad car, particularly freight cars, conventionally engages a partial or segment bearing within a journal box. The journal extends into the box from the rear side thereof, and it is a common practice to construct the journal box with a vertically oriented slot in which is disposed a dust guard presenting a 360° opening intended to embrace the so-called dust guard seat of the axle to preclude the entrance of foreign matter into the journal box. The dust guard seal also prevents the loss of oil from the journal box.

The conventional dust guard is of one-piece construction which, as noted, fits a slot in the rear side of a journal box. It is not possible to install the conventional dust guard except that the car axle and journal box be separated. This also applies to removal of the dust guard. The primary object of the present invention is to construct a dust guard to enable the same to be installed in and removed from the journal box even though the journal is disposed operatively in the journal box. A related object of the present invention is to accomplish this specifically by way of a dust guard constructed in a novel manner from two parts which themselves are fabricated in a unique fashion.

Under and in accordance with the present invention, a dust guard is constructed of two complemental interfitting parts which, when assembled in the intended manner, result in a dust guard of standard geometry insofar as peripheral surfaces are concerned. However, in achieving an operative condition, and in particular in assuring rigidity of the dust guard and proper retention in the journal box, the two parts of the dust guard are engageable along surfaces inclusive of sloped surfaces, and these two parts are to be pulled tightly together and secured as a unitary element as the final step in arranging the dust guard within the journal box. The dust guard as thus constructed and assembled represents a specific object of the present invention.

Other and further objects of the present invention will be apparent from the following description and claim and are illustrated in the accompanying drawings which, by way of illustration, show a preferred embodiment of the present invention and the principles thereof and what is now considered to be the best mode contemplated for applying those principles. Other embodiments of the invention embodying the same or equivalent principles may be used and structural changes may be made as desired by those skilled in the art without departing from the present invention and the purview of the appended claim.

Figure 1:
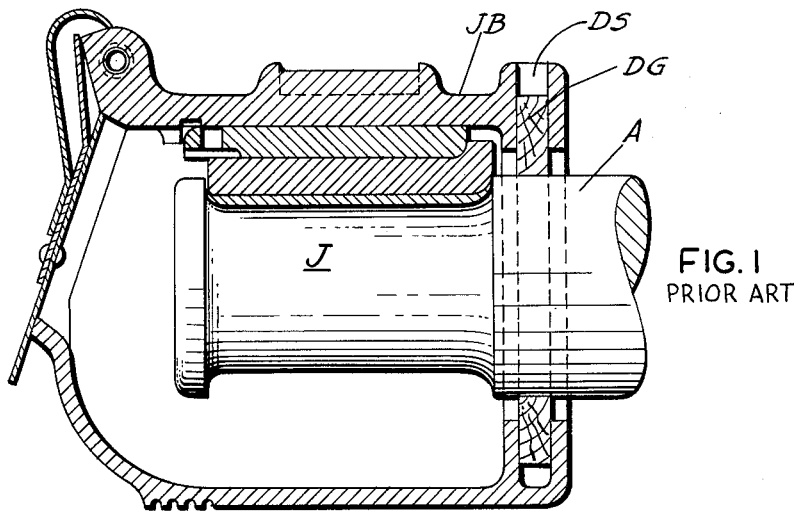
FIG. 1 is a sectional view of a standard railroad journal box.

A railroad journal box JB of standard construction is illustrated in FIG. 1. The journal box JB is provided with a dust guard slot DS at the end thereof that will face the car wheel in which is normally disposed a dust guard DG, FIG. 2, of standard construction.

Figure 2:
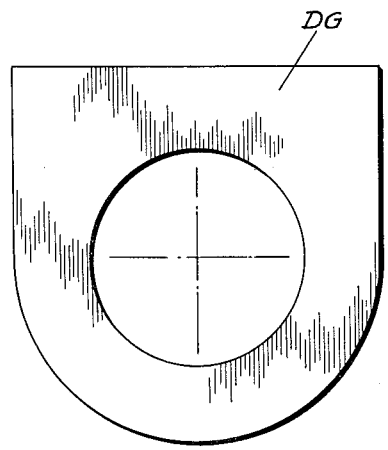
FIG. 2 is a plan view of a standard dust guard.

The dust guard in FIG. 2 is of continuous one-piece construction, and the slot in which the dust guard is to be disposed is generally of U-shape, open at the top of the box as will be evident in FIG. 1 to enable the dust guard to be inserted into the slot from the open top thereof. This is intentionally a somewhat loose fit to enable the dust guard to shift in its own plane with the car axle A.

It will be evident from what has been explained above that the journal portion J, FIG. 1, of the car axle A which will be disposed within the journal box shown prevents the dust guard from being removed except upon separating the journal box and the journal. This is also true of installation. These disadvantages are overcome under the present invention in the manner to be explained in detail hereinafter.

Figure 5:
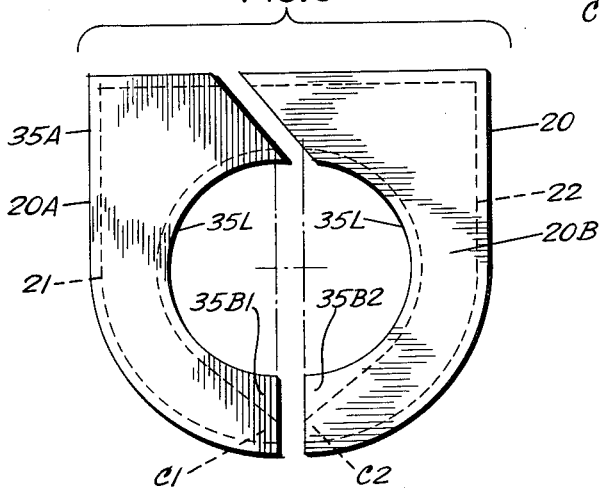
FIG. 5 shows the dust guard of the present invention separated into the two operative parts thereof.

Referring to FIG. 5, the dust guard of the present invention is identified by reference character 20 as inclusive of two principal sections 20A and 20B which are engageable one with another along surfaces hereinafter identified to complete what will otherwise correspond substantially to the geometry of the standard dust guard illustrated in FIG. 3, but with several minor exceptions to be noted hereinafter.

Figure 3:
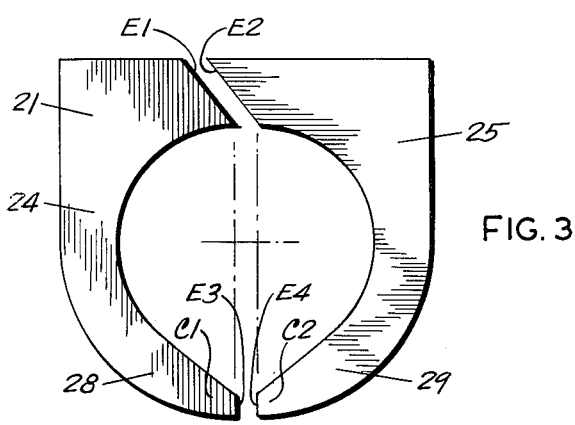
FIG. 3 is a view of the two rigid parts of the dust guard of the present invention prior to the application of the plastic covering thereto.
Figure 3A:
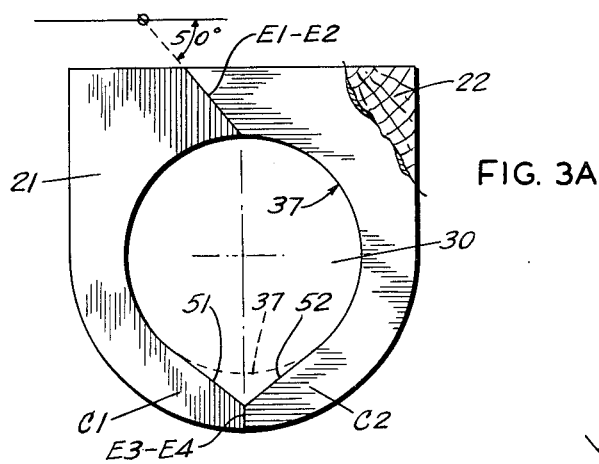
FIG. 3A shows the manner in which the parts shown in FIG. 3 can be mated along complemental edges.

The dust guard 20 includes a pair of relatively rigid inserts 21 and 22, FIGS. 3 and 3A, of plywood or the like. These inserts are somewhat undersized in comparison to the completed structure 20 in their bare or uncased condition. Each insert 21 and 22 includes straight side edges 24 and 25 and flat top surfaces 26 and 27. Additionally, each of the inserts includes an arcuate lower edge 28 and 29 which conform to the rounded bottom of the dust guard slot in the journal box.

The insert 21 is provided with a sloped edge as E1 at the top thereof, and the insert 22 is provided with a sloped surface E2 at the top edge thereof having the same angle or slope as the edge E1. The insert 21 has a narrowing toe portion C1 at the bottom thereof terminating in a vertically straight edge E3, and the insert 22 is shaped with a narrowing toe portion C2 having an edge E4 engageable with the edge of the toe portion C1 as illustrated in FIG. 3A.

In the juxtaposed assembly shown in FIG. 3A, it will be noted that the plywood inserts when joined together produce a somewhat tear-shaped opening 30 which has an upper part 37 of true circular form, and a lower part that is somewhat V-shaped in appearance due to the narrowing toes C1 and C2. These segments of the opening defined by the mated parts are the result of narrowing the inserts along the substantially straight lines S1 and S2, FIG. 3.

The inserts above described afford what can be termed the skeleton or rigid framework of the completed dust guard, and these inserts are to be arranged in the mold, hereinafter described, whereafter a plastic in an uncured condition is forced into the mold and is cured to produce the integrated assembly illustrated in FIG. 4.

Figure 4:
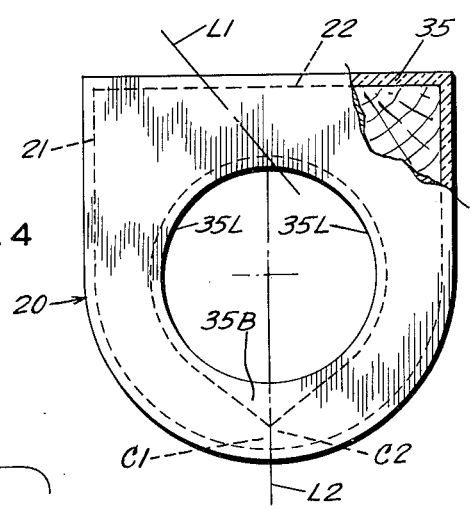
FIG. 4 is a view of the dust guard of the present invention after molding.

Thus, referring to FIG. 4, it will be observed that the inserts 21 and 22 are embedded in an outer covering or casing of foam plastic 35 such as polyurethane or similar resilient, spongy plastic material adapted to afford a good seal in the dust guard slot. This is accomplished by supporting the inserts 21 and 22 in a mold substantially in the arrangement of FIG. 13, that is, with some slight spacing between the opposed edges E1–E2 and E3–E4.

The unoccupied portion of the mold represents space which will be filled by the uncured plastic foam that is to afford the outer covering 35. Consequently, after the inserts 21 and 22 have been properly arranged in the mold, the latter is filled with the uncured plastic which is then cured, and the assembly represented by what is shown in FIG. 5 is what will be stripped from the mold. It will be observed in this connection that the plastic 35 extends outward of the inserts from all sides thereof so as to afford a cushion periphery 35A entirely about the periphery of the inserts. There is also a facing of plastic foam on the outer faces of the inserts.

Additionally, the assembly illustrated in FIG. 4 includes a continuous 360° internal liner 35L entirely of plastic free of the internal surfaces of the inserts described, and this cushion-type liner is intended to produce an efficient seal about the dust guard portion of the car axle.

It should finally be noted in connection with FIG. 4 that there is an internal section of plastic 35B that fills the space below the dotted line 37 noted in FIG. 3A where the toes C1 and C2 are located. This produces a truly circular liner in contrast to the tear-shaped opening 30.

Following removal from the mold of the assembly shown in FIG. 4, the plastic foam is cut along the two lines L1 and L2, FIG. 4, where the edges E1–E2 and E3–E4 are joined by plastic, thereby resulting in the creation of the two sections 20A and 20B. Each of these will have a pad of plastic 35B1 and 35B2 immediately adjacent the respective toe portions of the inserts 21 and 22. This facilitates insertion of the sections into the dust guard slot as will now be explained.

Figure 6:
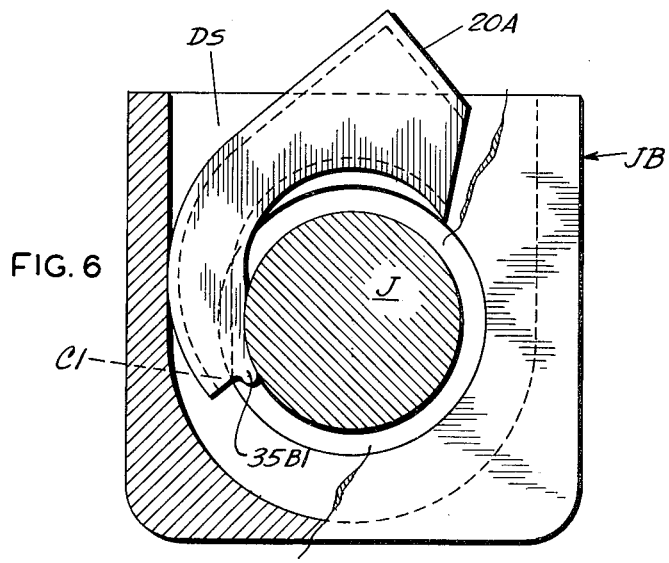
FIG. 6 illustrates the manner in which the dust guard of the present invention will be associated with the journal box.
Figure 7:
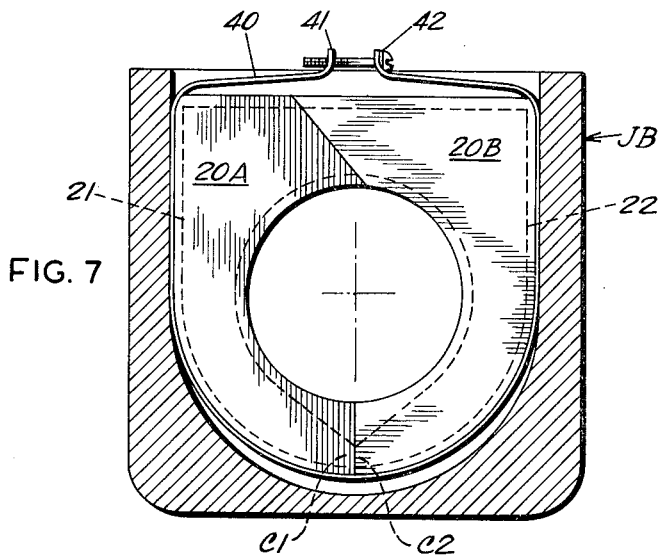
FIG. 7 is a view showing the completed installation.

In FIGS. 6 and 7 the journal box JB and the dust guard slot therein are schematically illustrated along with the journal J of the car axle representative of the condition where the journal, prior to installation of the dust guard of the present invention, is projecting into the journal box through the opening provided therein. The two sections 20A and 20B of the dust guard of the present invention are adapted to be separately and individually installed in the journal box with the journal in operative position. The procedure is apparent from what is shown in FIG. 6 where the dust guard section 20A has been oriented with what amounts to the lower end thereof (adjacent 35B1) being inserted into the journal box in the space corresponding thereto between the left-hand side of the journal J and the corresponding side of the dust guard slot.

Insertion is facilitated by the fact that the pad of sponge material 35B1 can be compressed by the journal J to move therepast in the narrow space that corresponds to the horizontal center line of the journal J. In other words, the rigid toe C1 of the insert 21 is narrow enough to move between the left-hand side of the journal J as viewed in FIG. 6 and the opposed portion of the dust guard slot, and since the foam pad 35B1 is compressible, the latter does not interfere with the intended movement of the dust guard section 20A.

Similar manipulation will be involved in disposing the dust guard section 20B at the right-hand side of the journal J. Eventually the installation is completed with two dust guard sections disposed in an operative position in the dust guard slot as illustrated in FIG. 7.

It is here important to note that the two dust guard sections are to be retained in the dust guard slot in embracing relationship with respect to the journal J by a steel band 40 which will be arranged in the dust guard slot prior to installation of the dust guard sections 20A and 20B. The band 40 thus is intended to embrace the periphery of the dust guard, and by providing ears 41 and 42 at the free ends of the band 40 which are exposed at the top of the journal box and accessible there, these ears can be provided with apertures for receiving a screw type retainer 45 of conventional design intended to exert tension on the free ends of the band 40 sufficiently to engage the band tightly about the periphery of the dust guard 20A–20B.

It will be recognized from what is illustrated in FIGS. 6 and 7 that under the present invention a dust guard of the kind disclosed can be installed in a journal box without the need for separating the journal and the journal box. This also applies to removing the dust guard, such being made possible by constructing the dust guard of two separable sections that fit together along complemental edges. In this connection it should be stressed that the sloped edges E1 and E2 allow for a wedging action when drawing the two sections together by means of the band 40, or the equivalent.

Hence, while I have illustrated and described a preferred embodiment of the present invention, it is to be understood that this is capable of variation and modification, and I therefore do not wish to be limited to the precise details set forth, but desire to avail myself of such changes and alterations as fall within the purview of the following claim.

I claim:

A two-piece dust guard to be installed in the journal box of a railroad car and comprising two split parts engageable along mating edges, each such part including a cavity at one side thereof, which cavities cooperate with each other when the edges are mated to define substantially 360° opening for the journal of a railroad car, each of said split parts having a compressible portion at the mating edges adapted to be inserted about the journal so that the portions can be compressed by said journal to facilitate the inserting of the split parts about the journal, securing means for drawing the two parts into tight engagement one with another at the mating edges, said split parts have an outer covering of flexible material and an interior supporting portion of more rigid material, and said rigid material being reduced at said inserted mating edges to facilitate the compressing of said compressible portion when inserting the split parts about the journal.

References Cited by the Examiner

UNITED STATES PATENTS

| | | | |
|---|---|---|---|
| Re. 8,085 | 2/78 | Stephenson | 277—216 |
| 1,579,271 | 4/26 | Willoughby | 277—132 |
| 2,441,645 | 5/48 | Sale | 277—174 |
| 2,724,864 | 11/55 | Krotz | 18—42 |
| 2,845,657 | 8/58 | Beare | 18—36 |
| 2,893,761 | 7/59 | Peat | 277—173 X |
| 2,958,551 | 11/60 | Rogers | 277—134 X |
| 3,010,741 | 11/61 | Hoyer | 277—132 |
| 3,035,844 | 5/62 | Bollinger | 277—132 |
| 3,048,410 | 8/62 | Bryant | 277—10 |

LEWIS J. LENNY, *Primary Examiner.*

SAMUEL ROTHBERG, EDWARD V. BENHAM,
*Examiners.*